US012623743B2

(12) United States Patent (10) Patent No.: US 12,623,743 B2
Coury (45) Date of Patent: May 12, 2026

(54) MOTORCYCLE LUGGAGE SYSTEM

(71) Applicant: Thrashin Supply Co., Moorpark, CA (US)

(72) Inventor: Lance Coury, Moorpark, CA (US)

(73) Assignee: Thrashin Supply Co., Moorpark, CA (US)

( * ) Notice: Subject to any disclaimer, the term of this patent is extended or adjusted under 35 U.S.C. 154(b) by 37 days.

(21) Appl. No.: 18/630,810

(22) Filed: Apr. 9, 2024

(65) Prior Publication Data

US 2025/0313294 A1 Oct. 9, 2025

(51) Int. Cl.
B62J 9/23 (2020.01)
B62J 7/08 (2006.01)
B62J 9/27 (2020.01)

(52) U.S. Cl.
CPC ........................................ B62J 7/08 (2013.01)

(58) Field of Classification Search
CPC ................... B62J 9/23; B62J 9/27; B62J 7/08

USPC .......................................................... 224/413
See application file for complete search history.

(56) References Cited

U.S. PATENT DOCUMENTS 8,172,188 B2 * 5/2012 Dubinskiy ................. B62J 9/23
248/221.11
2015/0203165 A1 * 7/2015 Bunyer ...................... B62J 7/04
224/413

* cited by examiner

*Primary Examiner* — Jack W Lavinder
(74) *Attorney, Agent, or Firm* — KELLY & KELLEY, PLLC

(57) ABSTRACT

A motorcycle luggage system includes first and second mounts attached to a motorcycle. A luggage supporting bracket includes first and second docks for removable attachment to the first and second mounts. The first and second docks are selectively adjustably spaced from one another so as to correspond to the spacing of the first and second mounts on the motorcycle, so as to be able to be used with a wide variety of motorcycles.

20 Claims, 18 Drawing Sheets

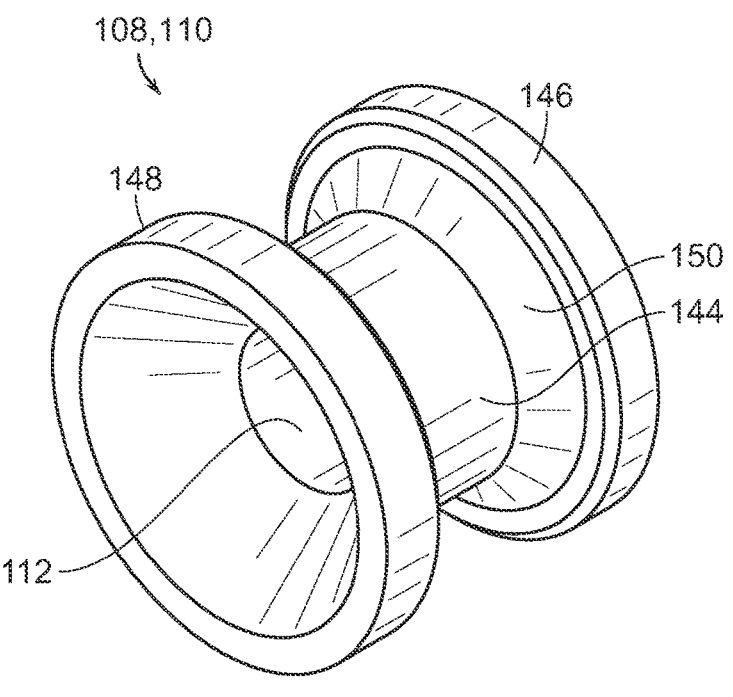
FIG. 9
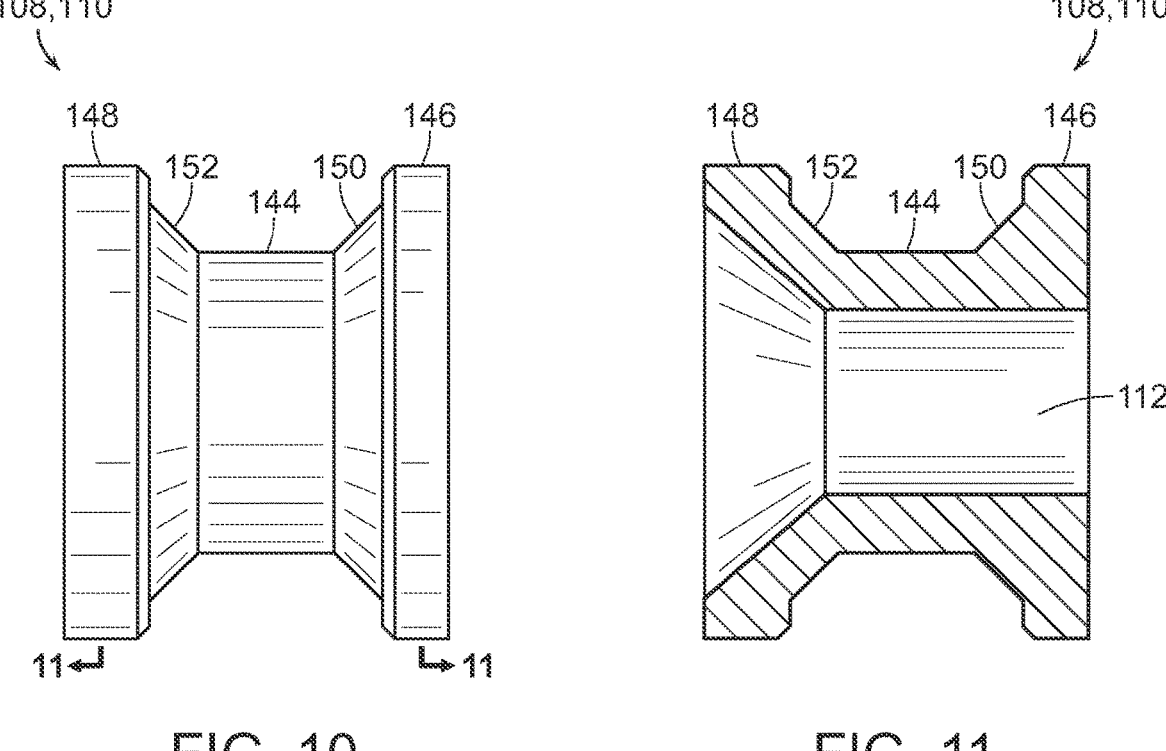
FIG. 10              FIG. 11

MOTORCYCLE LUGGAGE SYSTEM

FIELD OF THE INVENTION

The present invention generally is concerned with motorcycle luggage bags and mounts. More particularly, the present invention is directed to a luggage system which is convenient to attach to a wide variety of motorcycles.

BACKGROUND OF THE INVENTION

In old times, the term "saddle bags" was used for the luggage bag mounted on the back of the horse. Such included two bags connected to a strap in between so that they could be easily hung on both sides of the horse. The same idea from horse riding was put into practice by motorcyclists.

Initially, the same throw-over saddle or luggage bags were installed on motorcycles to provide adequate storage space for riders to carry items. Such throw-over motorcycle saddle bags interconnected with a strap were easy to mount on a motorcycle and did not require one to spend money for the installation or require specialized assistance to mount the saddle bags on the motorcycle. However, such throw-over saddle bags also had disadvantages. Due to not being firmly mounted, the throw-over saddle bags could move a lot during the ride, causing distraction to the rider. They could also be unsafe as they could incline more towards the rear wheel of the motorcycle and cause an obstruction and the spinning of the wheel. Moreover, the main strap connecting the saddle bags could make the riding experience uncomfortable for passengers, especially on long-distance rides. Furthermore, such throw-over saddle bags did not provide a clean look to the motorcycle.

Eventually, hard-mounted luggage bags and cases generally replaced throw-over saddle bags to overcome their limitations. Such hard-mounted luggage cases use solid and rigid mounting options, such as nuts and bolts to keep the bags and cases fixed in place. The cases are often made of hard materials, including fiberglass, metal, or ABS plastic. Hard-mounted motorcycle cases had advantages over the throw-over soft mounted saddle bags, including being firmly installed on a motorcycle to restrict any sort of movement and vibrations during the ride. There is little to no chance that the hard-mounted cases will come off or fly away during the ride due to being firmly mounted. Moreover, hard-mounted luggage cases are also a safer option compared to throw-over or soft saddle bags as they are rigid and there is no chance of them coming closer to the rear wheel.

However, there are disadvantages of hard-mounted motorcycle luggage cases. This includes requiring special tools to mount them on the motorcycle's rear end. If one does not have the required tools and skills, that person must hire a professional to install the hard-mounted cases onto the motorcycle, which can be expensive. It can take a few minutes to an hour to install, or uninstall, these cases securely on the motorcycle. Another disadvantage of hard-mounted motorcycle cases is that they are typically custom built for a particular motorcycle or a particular size of motorcycle. Thus, the hard-mounted motorcycle case is attachable only to a single type of motorcycle or a very limited number of motorcycles. If an individual purchases a new motorcycle, or has more than one motorcycle, that individual will usually have to purchase a new or different hard-mounted motorcycle cases for that particular motorcycle.

Accordingly, there is a continuing need for a motorcycle luggage system, in the form of a hard-mounted motorcycle bag or case, which is relatively easily installed on a motorcycle without the need for specialized tools or an excessive amount of time. What is also needed is such a motorcycle luggage system which is capable of being attached universally to all motorcycles, or a very large number of different types of motorcycles. The present invention fulfills these needs and provides other related advantages.

SUMMARY OF THE INVENTION

The present invention resides in a motorcycle luggage system. The system generally comprises a luggage supporting bracket. The luggage supporting bracket comprises an attachment portion and a supporting portion extending from the attachment portion for supporting luggage thereon.

A first dock and a second dock are attached to the luggage supporting brackets, and more particularly the attachment portion of the luggage supporting bracket. The first and second docks are selectively adjustably spaced from one another.

A first mount and a second mount are attached to a motorcycle to extend therefrom in spaced relation to one another. The first dock is coupled to the first mount and the second dock is coupled to the second mount to attach the luggage supporting bracket to the motorcycle. Preferably, the first and second docks are manually detachably connected to the first and second mounts.

The first and second docks may be slidably associated with one another on the luggage supporting brackets. The luggage supporting brackets may include an elongated slot through which either the first or second dock is selectively slidably connected. The first or second dock may be connected to the slot along a length thereof to selectively adjust the distance between the first and second docks for responding to a distance between the first and second mounts attached to the motorcycle.

At least one of the first and second dock may include a locking pin for locking the first or second dock to the first or second mount. The locking pin may be movable into an open position biased towards a closed locking position. A lever may be operably attached to the locking pin for manually moving the locking pin from the locking position to the open position.

The first and second mounts preferably each include an engagement portion having a beveled configuration. The first and second docks each include a mount receiving portion having a beveled configuration corresponding to the beveled engagement portions of the respective first and second mounts. The beveled receiving portions of the first and second docks interface with the beveled engagement portions of the respective first and second mounts to securely couple the first and second docks to the first and second mounts.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 9 is a perspective view of a mount of the system of the present invention;

FIG. 10 is a side view of the mount of FIG. 9;

FIG. 11 is a cross-sectional view taken generally along lines 11-11 of FIG. 10;

DETAILED DESCRIPTION OF THE PREFERRED EMBODIMENTS

As shown in the accompanying drawings, for purposes of illustration, the present invention resides in a motorcycle luggage system for motorcycles. The motorcycle luggage system of the present invention is designed so as to have a secure, yet removable, attachment to the motorcycle. Moreover, the motorcycle luggage system of the present invention is designed so as to be used with a large variety of different types and sizes of motorcycles.

Figure 1:
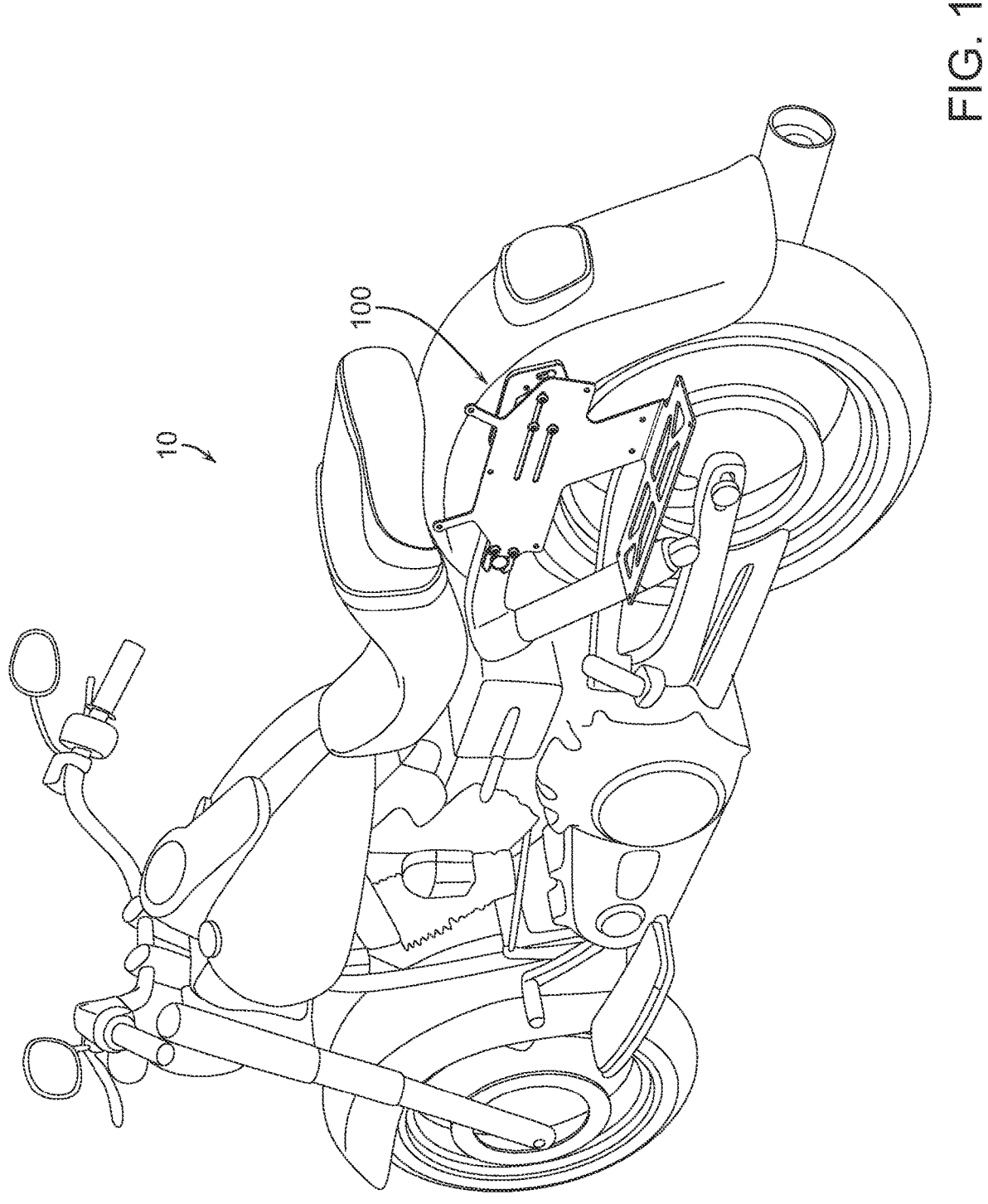
FIG. 1 is an environmental perspective view of a motorcycle luggage system attached to a motorcycle in accordance with the present invention.
Figure 2:
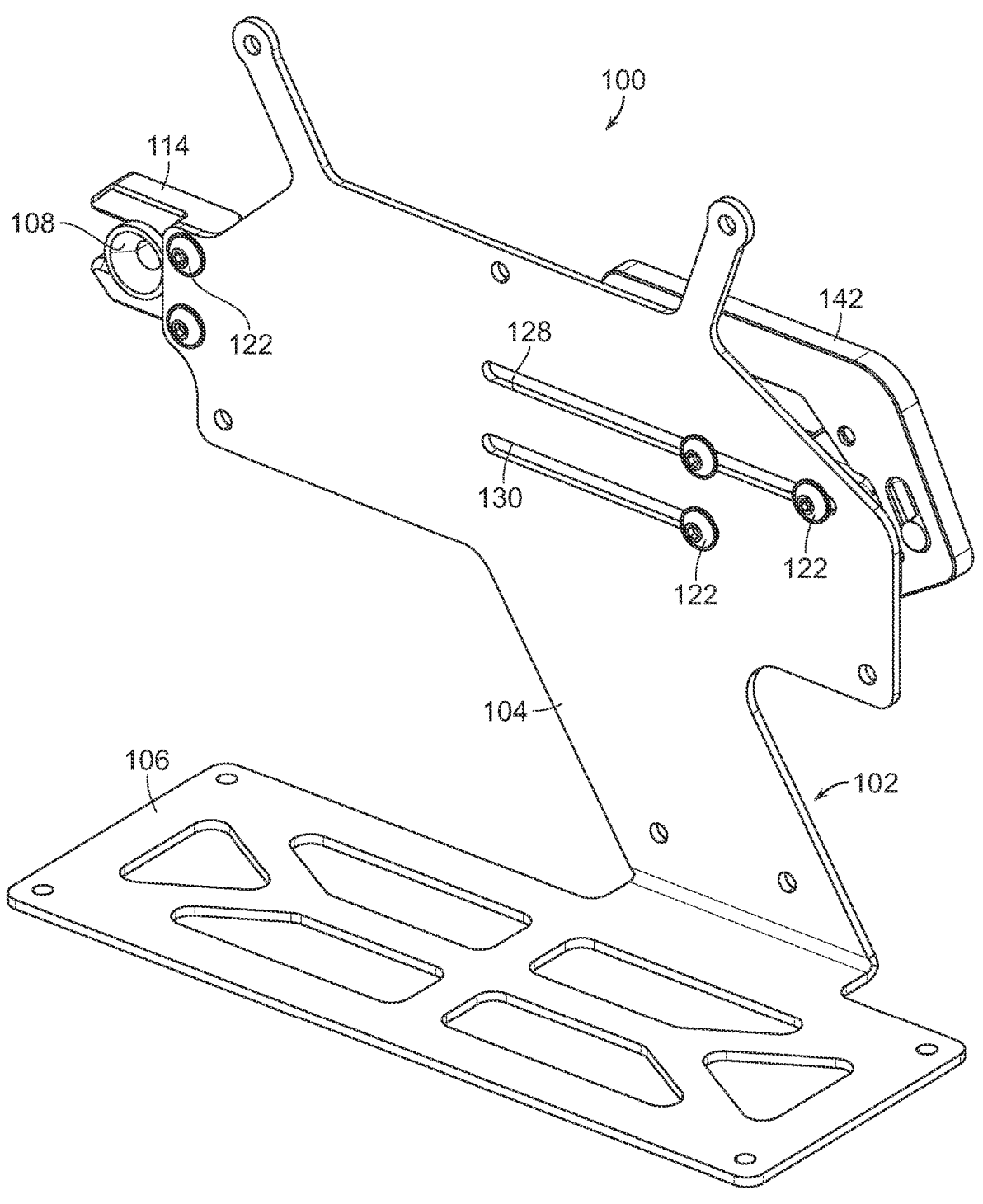
FIG. 2 is a front upper perspective view of the motorcycle luggage system of the present invention.

With reference now to FIG. 1, an exemplary motorcycle 10 is shown having a motorcycle luggage system 100 of the present invention attached thereto. The luggage system 100 of the present invention is attached to a portion of the motorcycle 10 which is adapted to receive it, such as a strut 12 or other member of the motorcycle 10. Such is usually positioned at the rear wheel and/or behind the seat of the motorcycle, as is illustrated and well known in the art. The connection points of the luggage system 100 to the motorcycle 10 can vary between different types or brands of motorcycles, depending upon the size of the motorcycle, the mounting members which the motorcycle 10 is manufactured with, etc. However, as will be more fully explained herein, the luggage system 100 of the present invention is designed to be attached to a wide variety and types of motorcycles, creating a universal or near universal ability to attach to motorcycles 10.

With reference now to FIGS. 2-7, the luggage system 100 has a luggage supporting bracket 102 which is attachable to the motorcycle 10 and which supports luggage thereon, such as via attachment to a luggage carrier, which may be a hard case, or the like. The luggage supporting bracket 102 comprises an attachment portion 104, which attaches to the motorcycle 10, and a supporting portion 106 which extends from the attachment portion 104 for supporting luggage, or a luggage case or carrier or the like. The attachment portion 104 and supporting portion 106 may be generally planar, such as comprising plate-like structures, which are angularly offset from one another, such as at a normal angle, as illustrated. Typically, the attachment portion or plate 104 extends generally vertically, while the luggage supporting portion or plate 106 extends generally horizontally.

Figure 16:
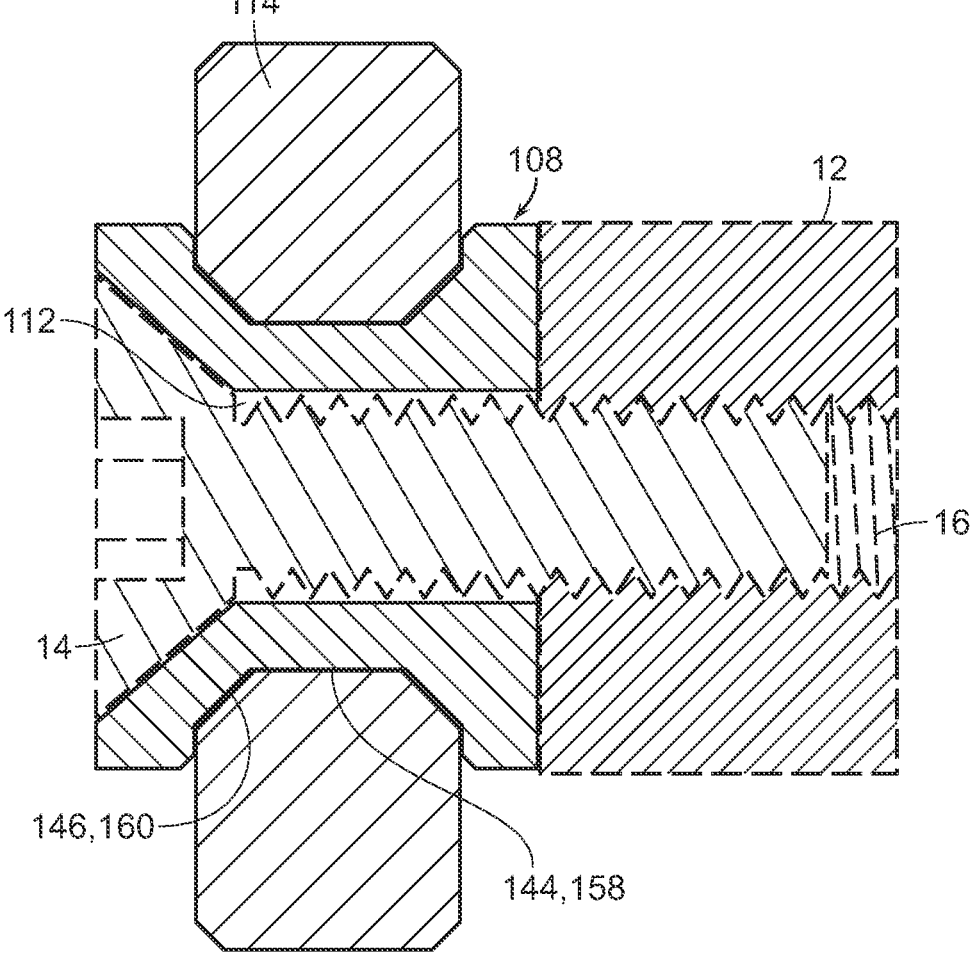
FIG. 16 is an enlarged cross-sectional view taken along line 16-16 of FIG. 15 illustrating a dock attached to a mount in accordance with the present invention.
Figure 17:
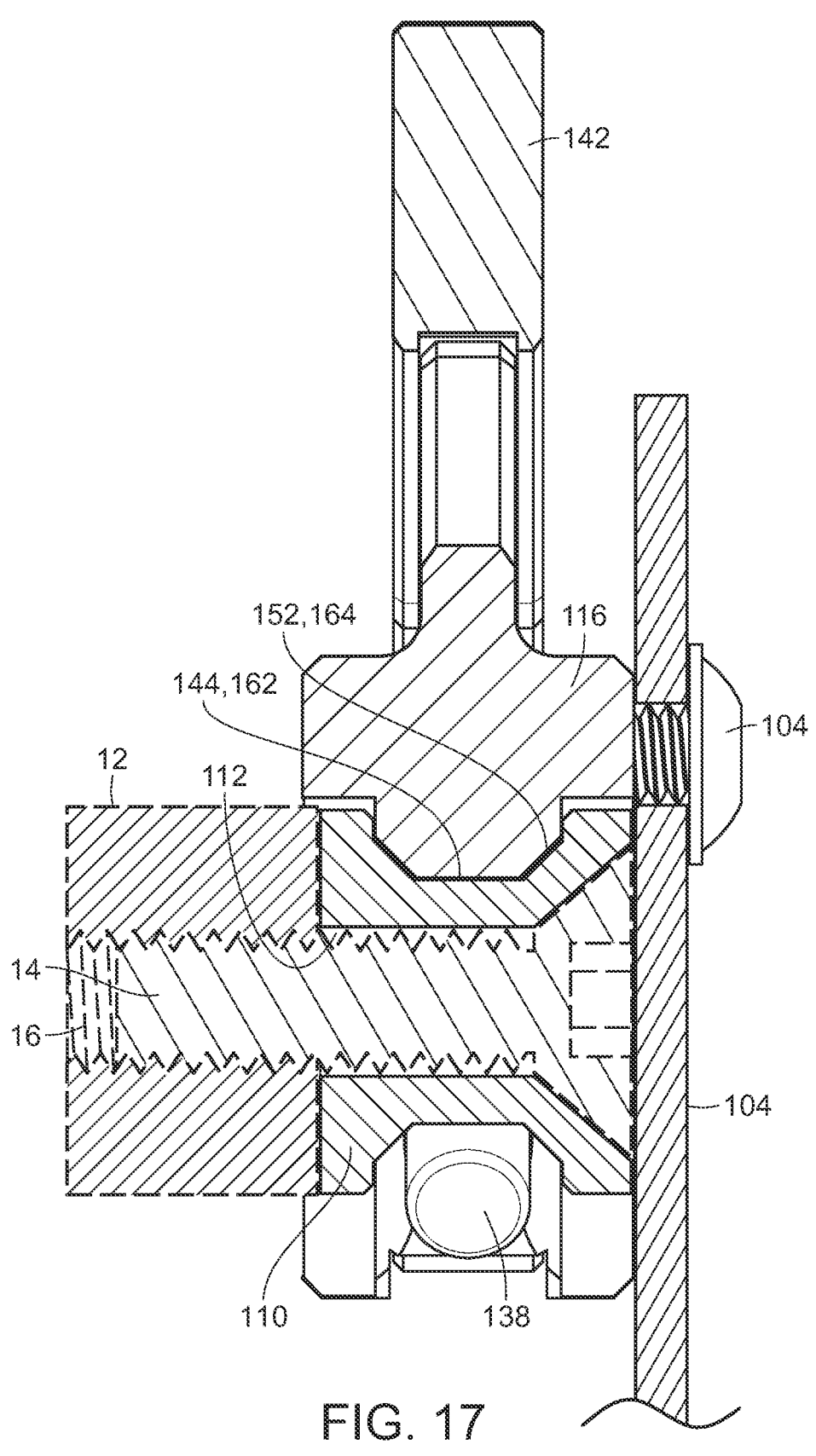
FIG. 17 is a cross-sectional view taken generally along line 17-17 of FIG. 15 illustrating a dock attached to a mount in accordance with the present invention.
Figure 18:
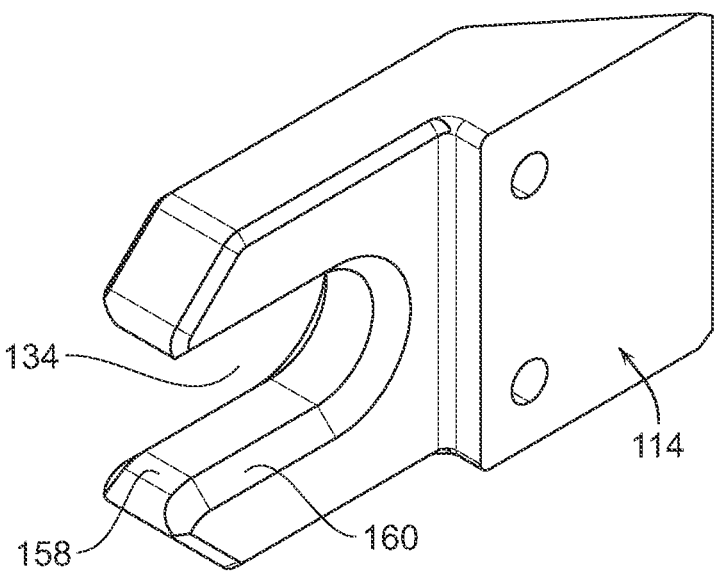
FIG. 18 is an upper perspective view of a first dock used in connection with the present invention.
Figure 19:
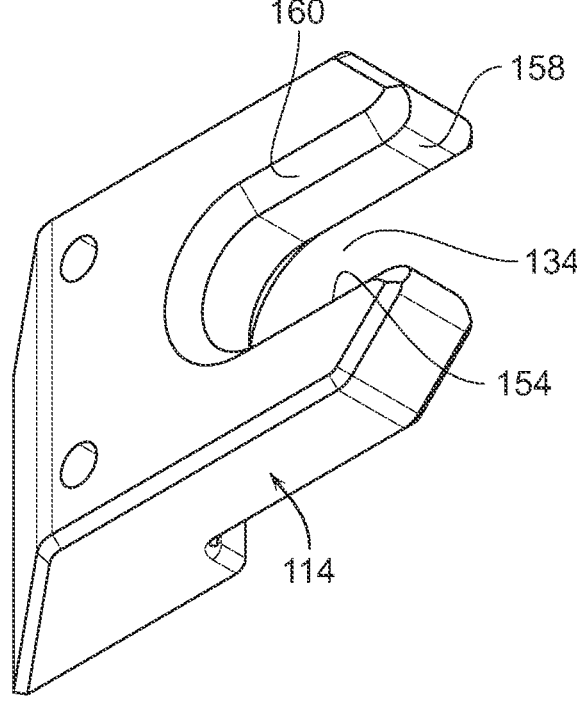
FIG. 19 is a rear perspective view of the dock of FIG. 18.
Figure 20:
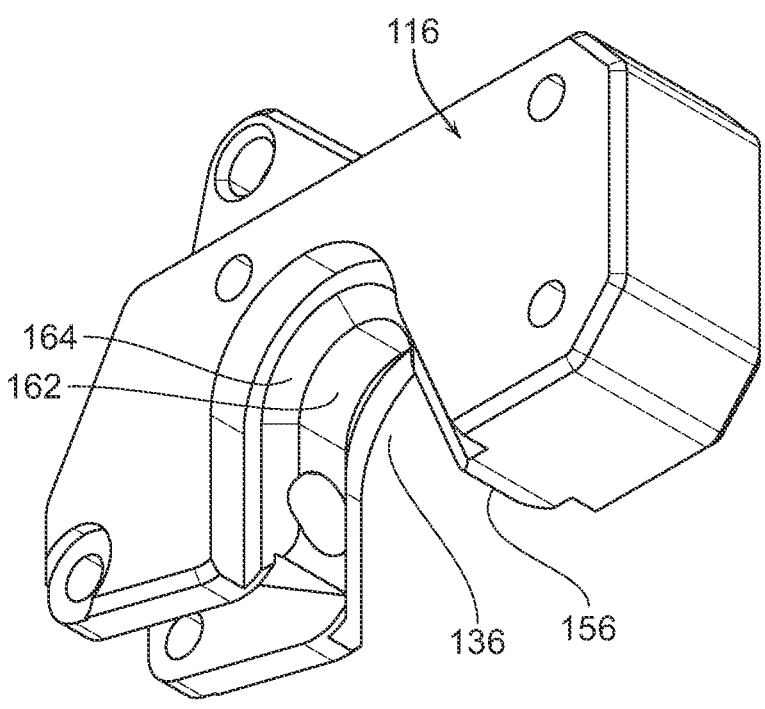
FIG. 20 is a lower perspective view of a second dock used in accordance with the present invention.
Figure 21:
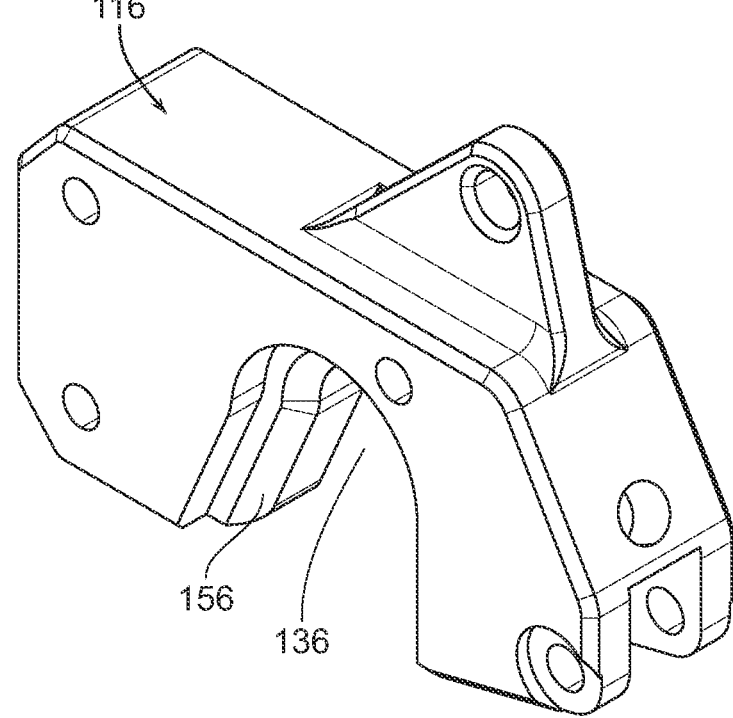
FIG. 21 is an upper perspective view of the dock of FIG. 20.

With reference now to FIGS. 8-17, the system 100 of the present invention includes first and second mounts 108 and 110 which are attachable to the motorcycle 10, such as a strut 12 of the motorcycle. As illustrated in FIGS. 11, 16 and 17, each mount 108 and 110 include a passageway 112 formed therethrough for reception of a fastener 14, such as a bolt or the like, for attachment to the motorcycle strut 12 or other mounting member of the motorcycle 10. The first and second mounts 108 and 110 are attached to the motorcycle so as to extend therefrom in spaced relation to one another. The spacing between the first and second mounts 108 and 110 may depend, at least in part, upon the motorcycle 10 to which they are attached. The motorcycle strut 12 or other mounting member may include internally threaded apertures 16 for receipt of the bolt or other fastener 14 therein so as to secure the mounts 108 and 110 to the motorcycle strut or mounting member 12. The distance between the internally threaded apertures 16 can vary from motorcycle to motorcycle.

Figure 3:
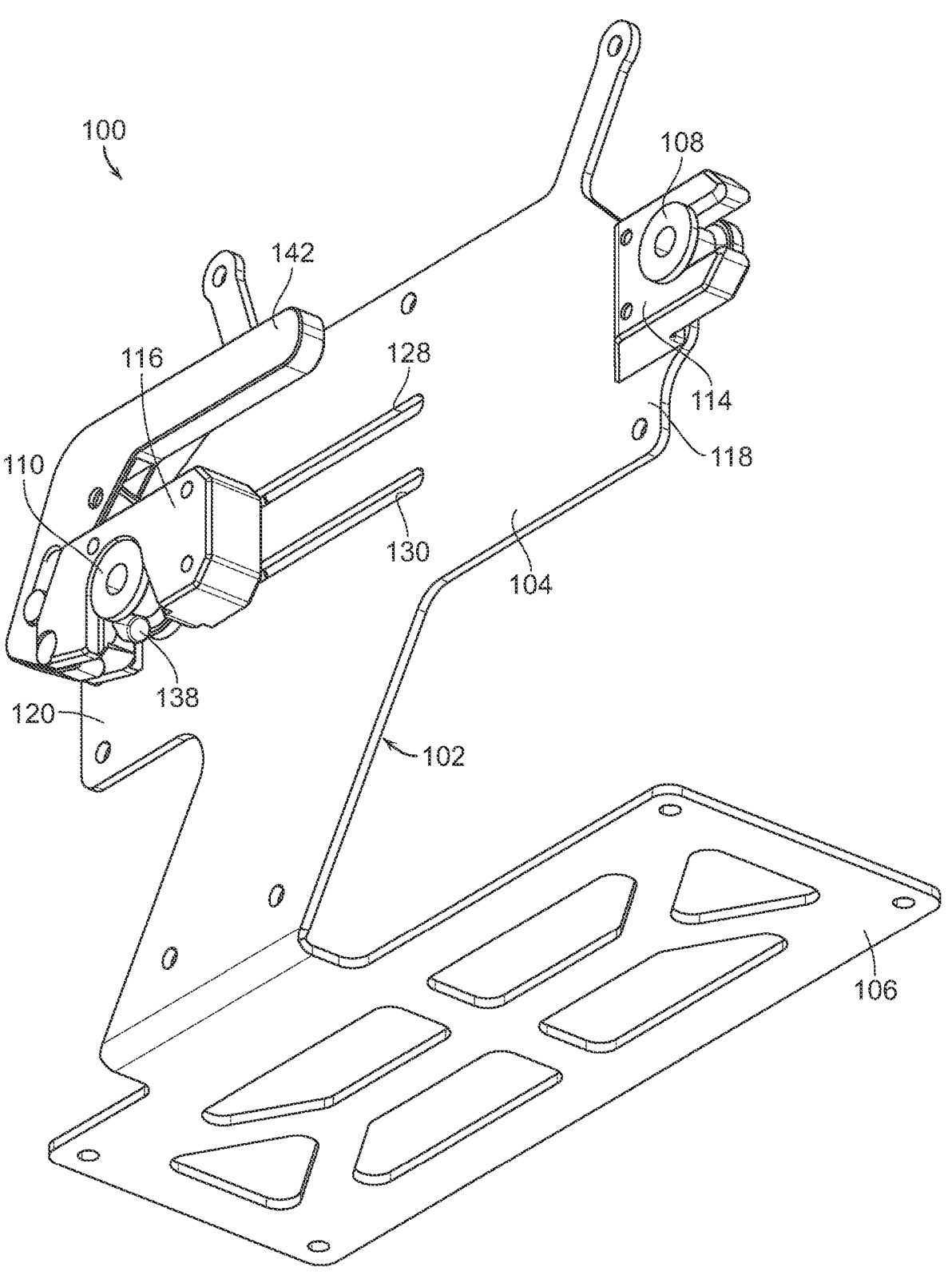
FIG. 3 is a lower rear perspective view of the motorcycle luggage system of the present invention.
Figure 4:
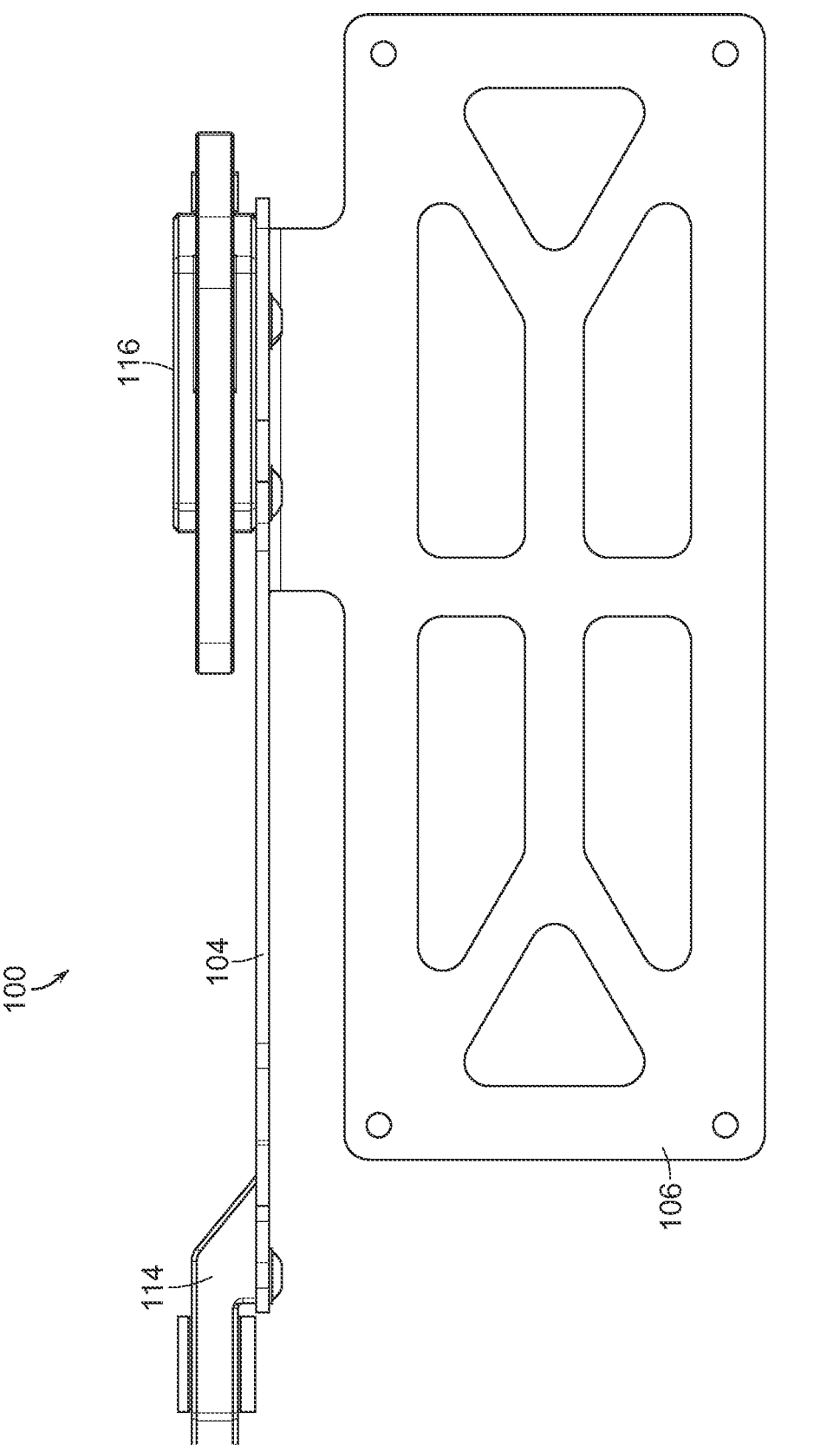
FIG. 4 is a top plan view of the motorcycle luggage system of the present invention.
Figure 5:
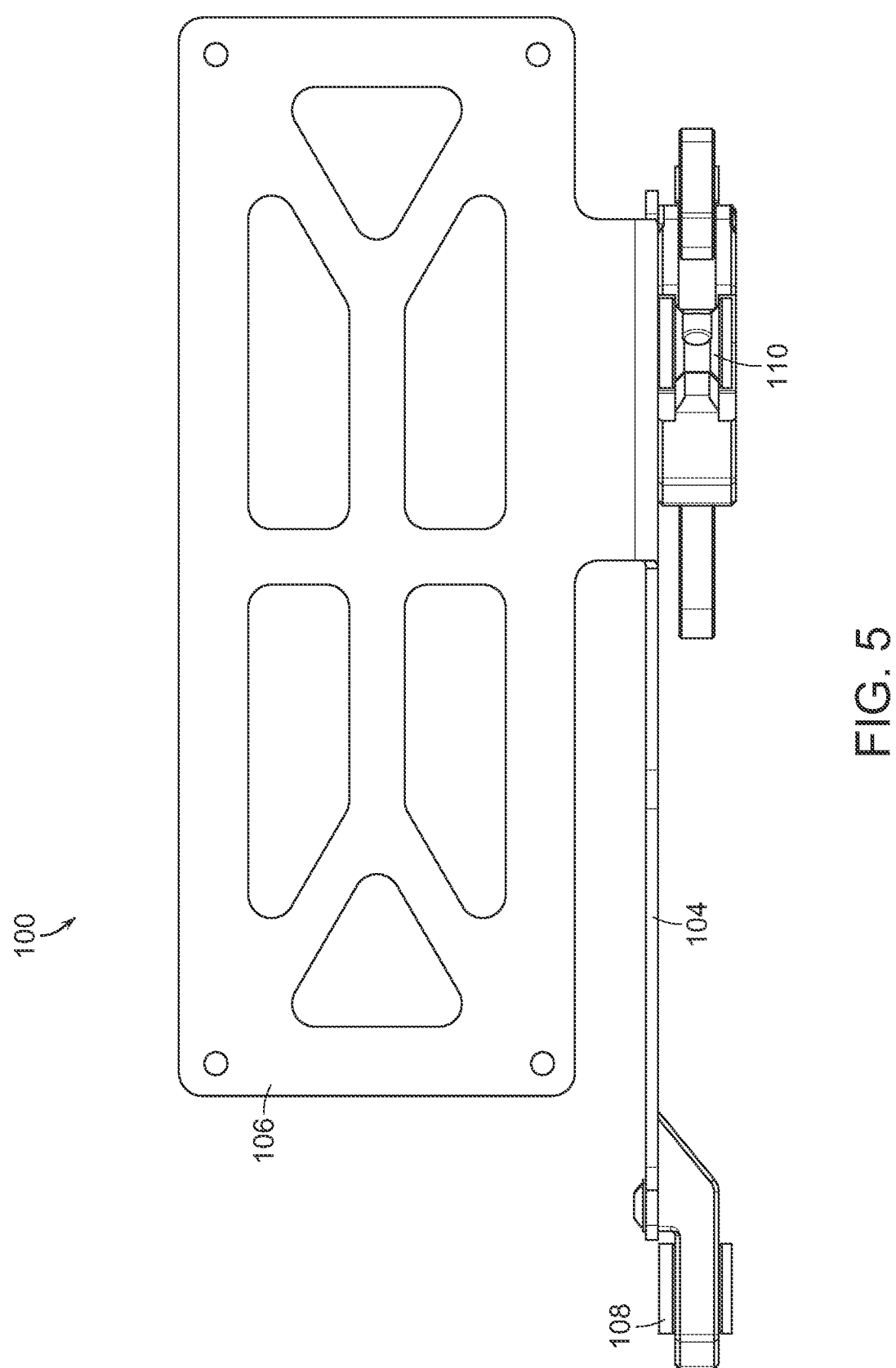
FIG. 5 is a bottom plan view of the motorcycle luggage system.
Figures 6, 7:
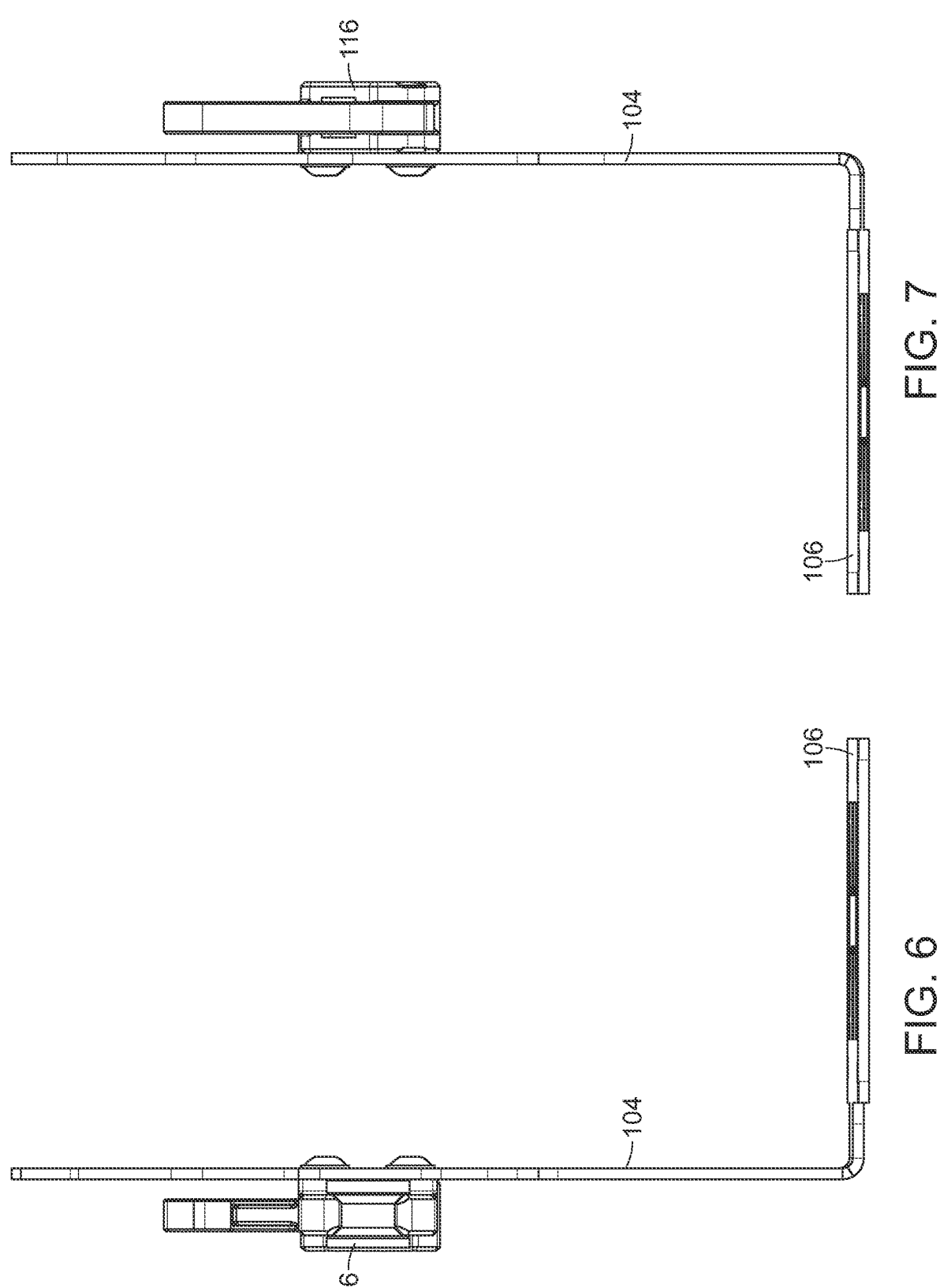
FIG. 6 is a left side elevation view of the motorcycle luggage system.
FIG. 7 is a right side elevation view of the motorcycle luggage system.
Figure 8:
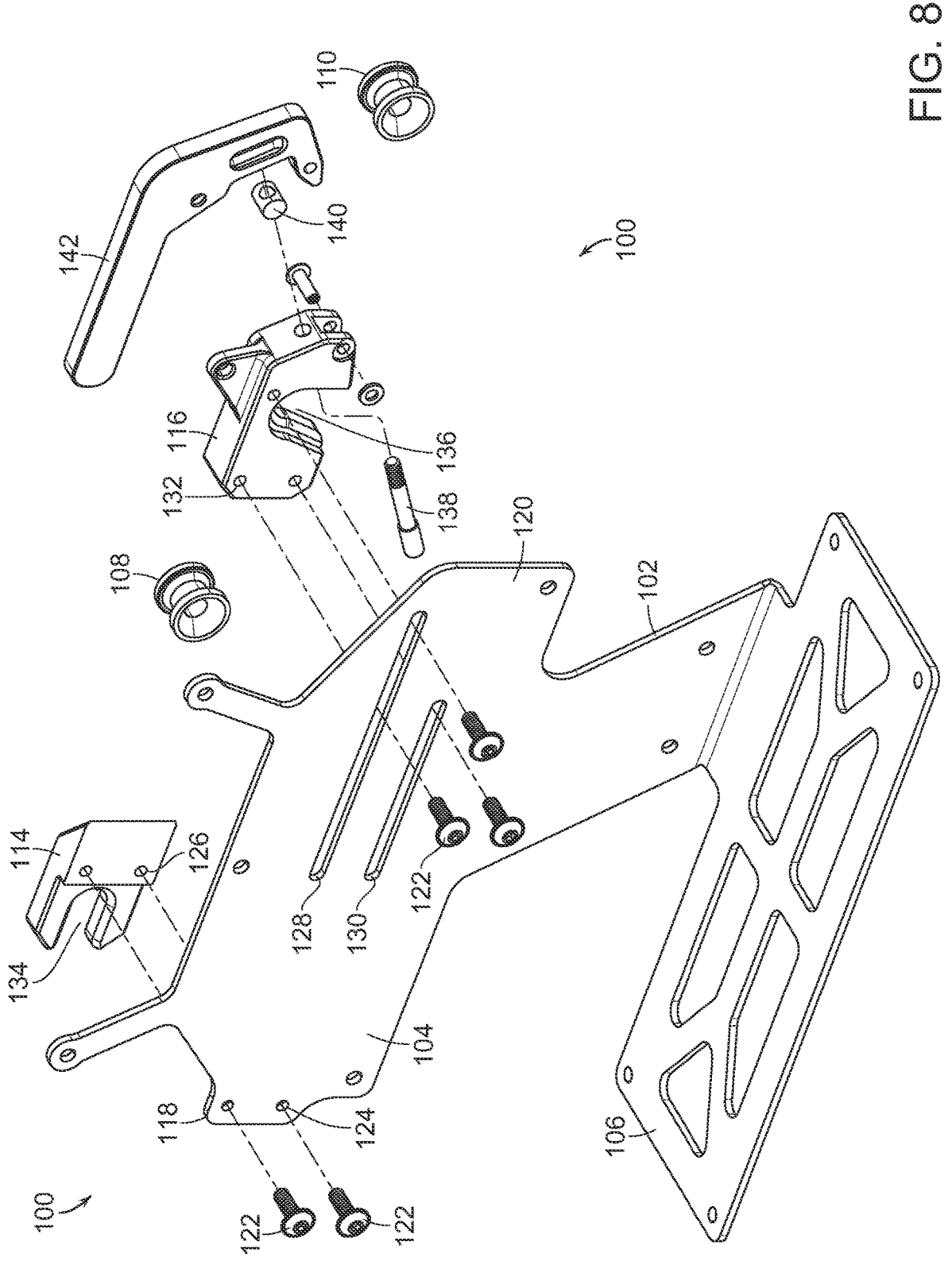
FIG. 8 is an exploded upper perspective view of the motorcycle luggage system of the present invention.
Figure 12:
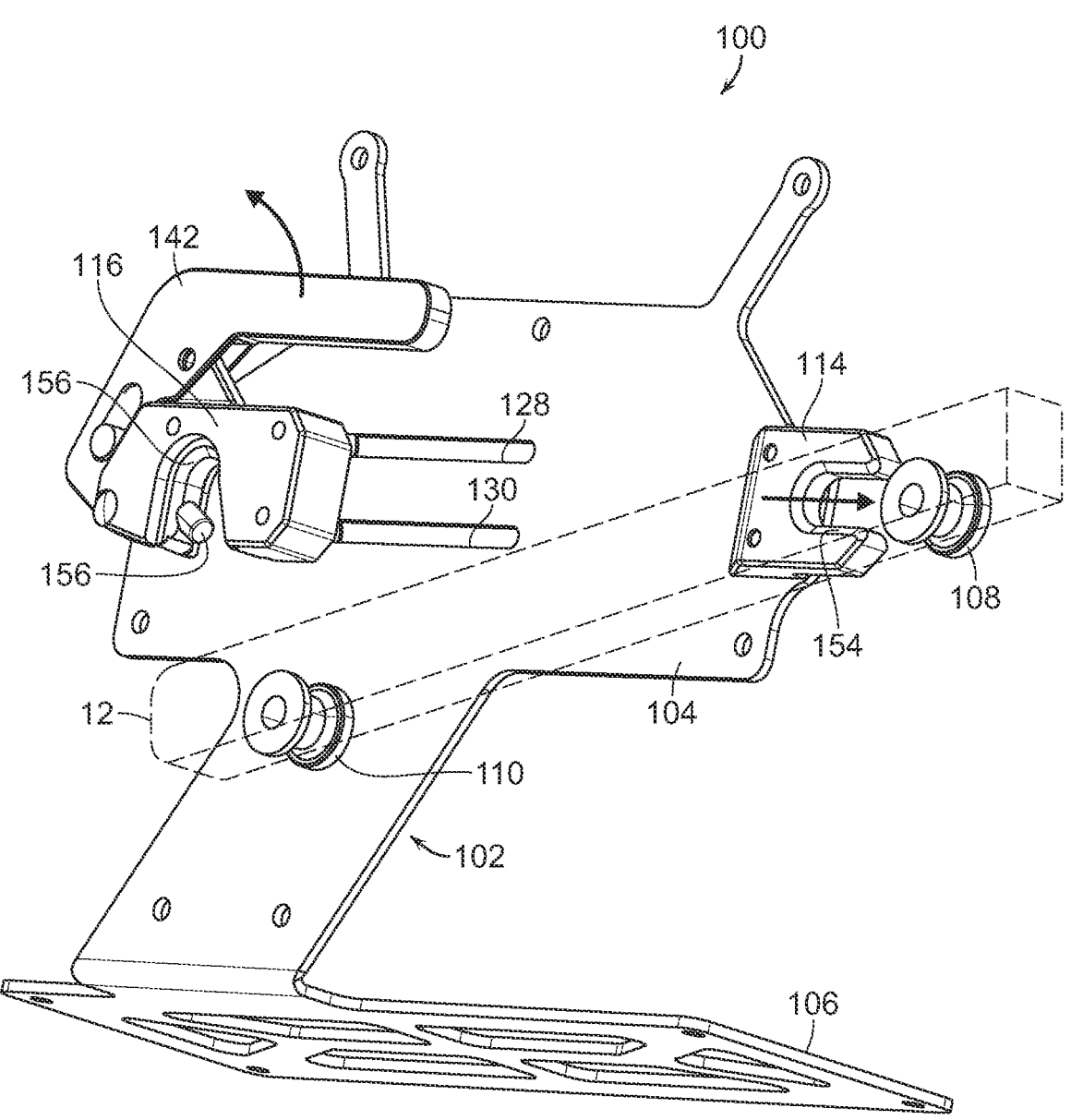
FIG. 12 is a rear perspective view of the motorcycle luggage system, being attached to mounts attached to a portion of a motorcycle, in accordance with the present invention.
Figure 13:
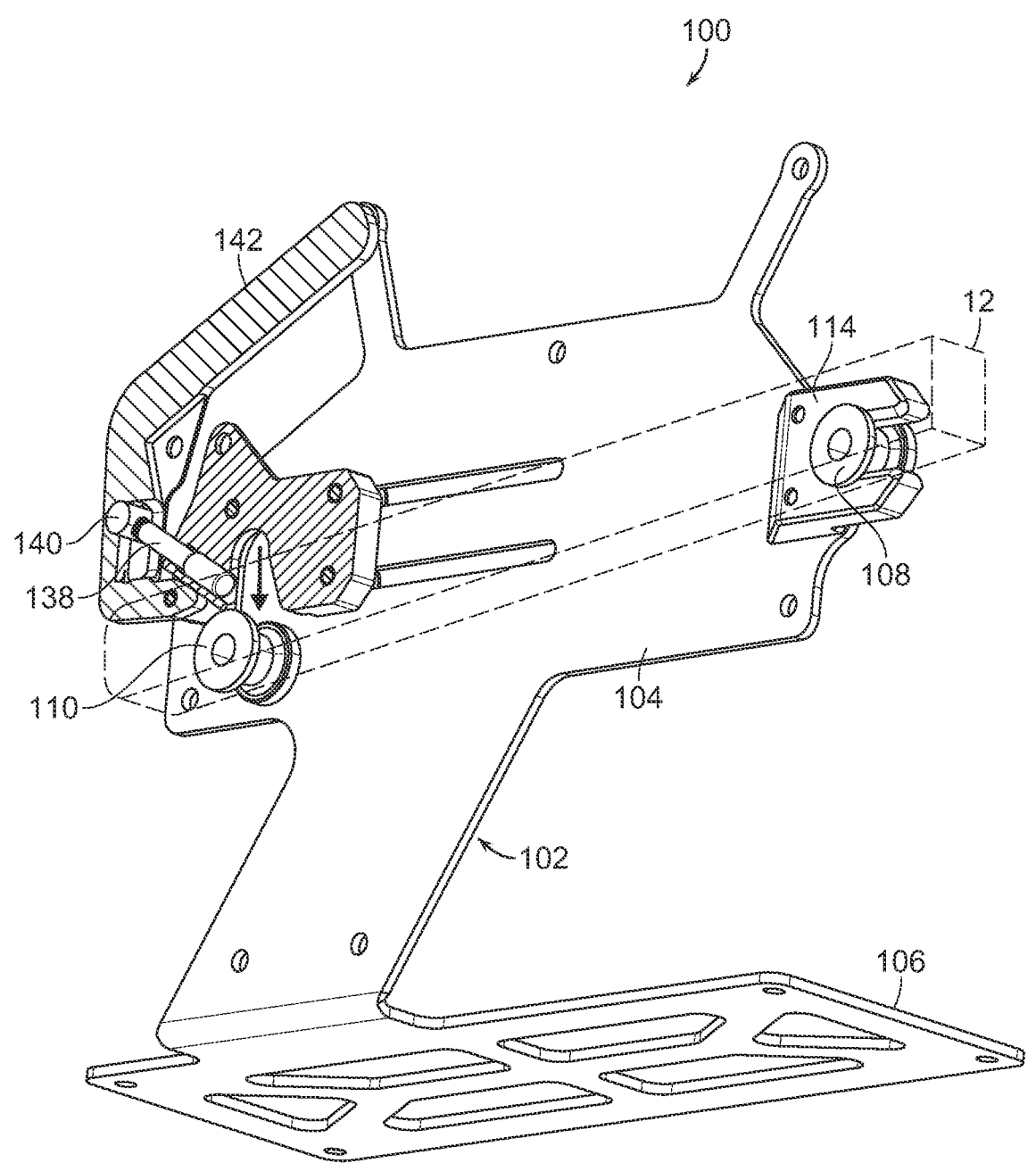
FIG. 13 is a partially sectioned perspective view illustrating the attachment of docks of the luggage system onto mounts of the luggage system, in accordance with the present invention.
Figure 14:
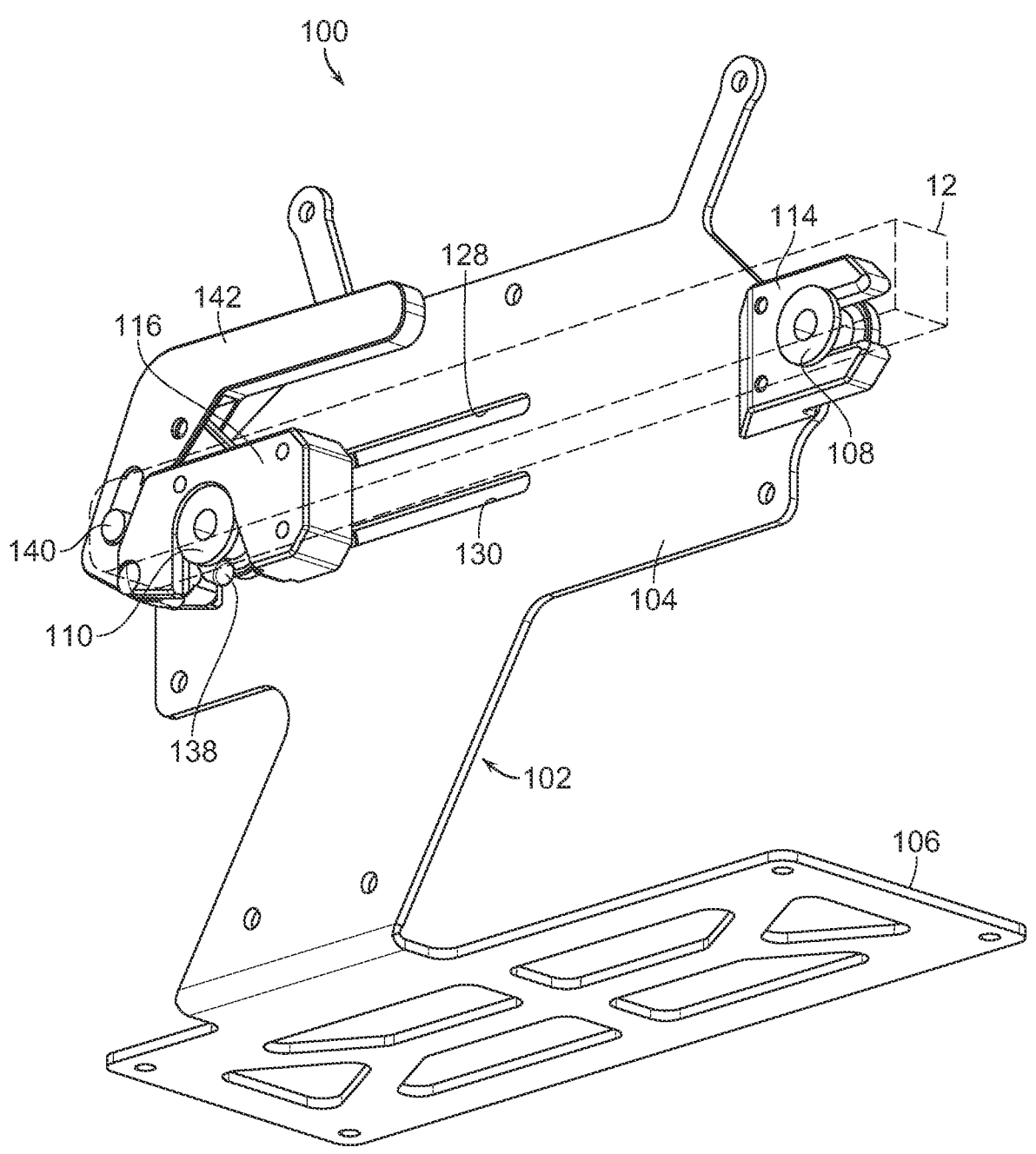
FIG. 14 is a rear perspective view of the motorcycle luggage system in an assembled and attached state.
Figure 15:
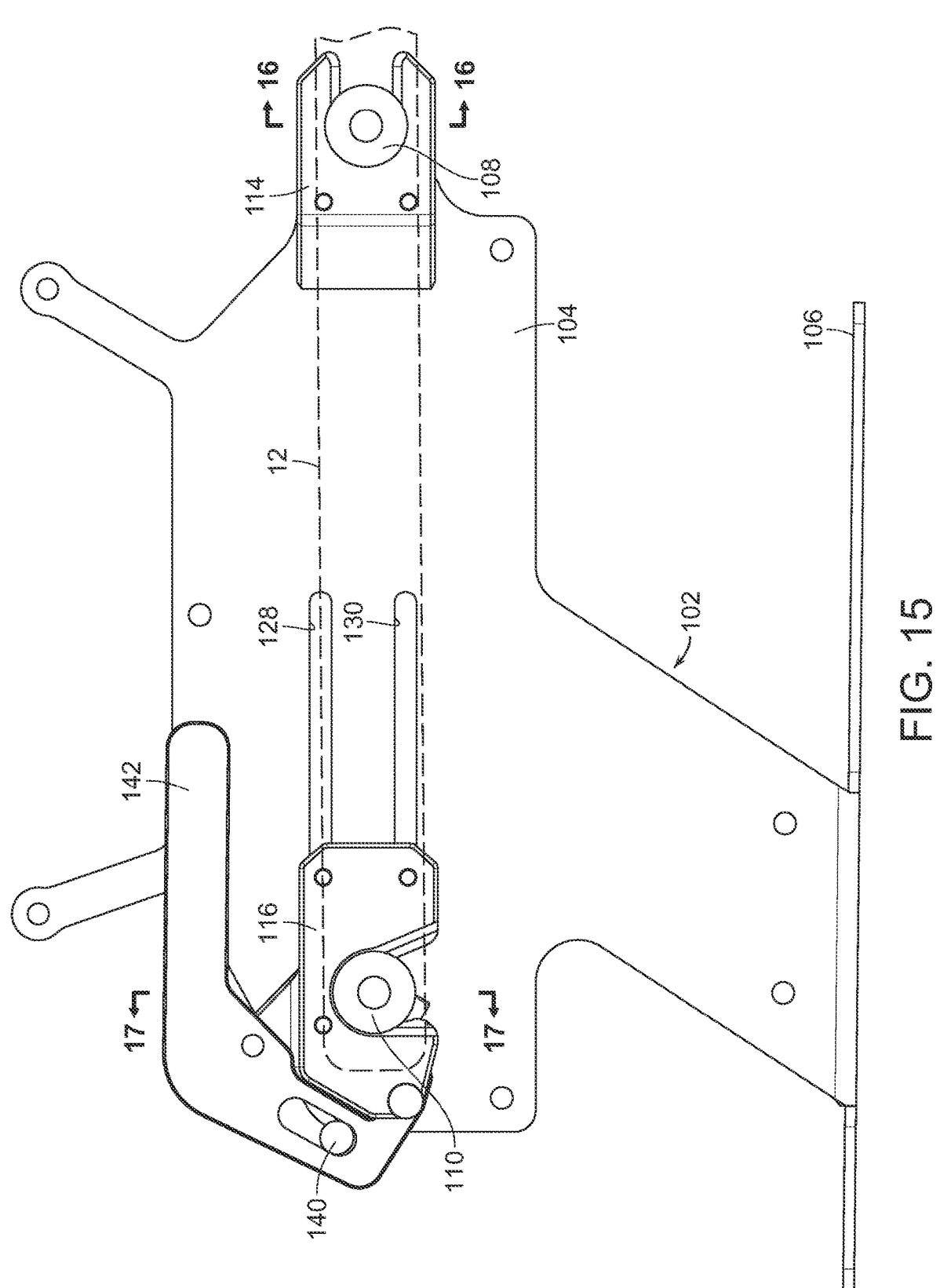
FIG. 15 is a rear side view of the system of FIG. 14.

With reference now to FIGS. 3 and 8, the luggage supporting bracket 102, and more particularly the attachment portion or plate 104 thereof has first and second docks 114 and 116 which are configured to detachably connect to the first and second mounts 108 and 110. Typically, the first and second docks 114 and 116 are attached to the attachment plate or portion 104 of the luggage supporting bracket 102. The first dock 108 is typically attached to a first end 118 of the attachment portion or plate 104, and the second dock 116 is attached to the attachment portion or plate 104 adjacent to a generally opposite second end 120 thereof, or intermediate the first and second ends 118 and 120 of the attachment plate 104.

As will be more fully described herein, in accordance with the present invention the first and second docks are selectively adjustably spaced relative to one another. For example, as illustrated in FIG. 8, the first dock 114 may be attached to the luggage supporting bracket 102, such as at or near the front end 118 of the attachment portion or plate 104 by means of fasteners 122, such as threaded bolts, which extend through aligned apertures 124 and 126 of the attachment plate 104 and first dock 114, such that at least a portion of the first dock 114 extends outwardly from the front end 118 of the attachment plate 104. The second dock 116 may be selectively slidably connected to the attachment plate 104 by means of fasteners 122 which extend through one or more slots or tracks 128 and 130 and into apertures 132 of the second dock 116. It will be appreciated, however, that other arrangements are contemplated by the present invention, wherein the first and second docks 114 and 116 are associated or attached to the luggage supporting bracket 102 by means of a series of apertures, multiple tracks, or tracks which extend substantially the length of the attachment plate 104 intermediate ends 118 and 120, etc. As mentioned above, the first and second docks 114 and 116 are selectively adjustably spaced from one another, such as being slidably associated with one another, on the luggage supporting bracket 102.

The first and second docks 114 and 116 each include a mount receiving portion, including an open-faced notch 134 and 136 into which at least a portion of the mounts 108 and 110 can be inserted into so as to secure the docks 114 and 116, and thus the attachment portion or plate 104, and thus the luggage supporting bracket 102 to the mounts 108 and 110, and thus the motorcycle 10. In the illustrated embodiment, the first dock 114 has an open-faced notch 134 facing directly forward, whereas the open-faced notch 136 of the second dock 116 faces generally downwardly. In use, the bracket is moved forward such that the first mount 108 is received within the receiving portion and notch 134 of the first dock 114, and then the second dock 116 is aligned with the second mount 110, and disposed thereon.

At least one of the docks 114 and/or 116 preferably includes a lock or locking mechanism so as to secure the dock to the respective mount. Preferably, such lock or locking mechanism is manually actuated for ease of use. For example, either the first and/or second dock 114 and/or 116 could include a locking pin 138 extending into the receiving portion 134 or 136, and selectively manually moved so as to enable the mount 108 or 110 to be inserted into the receiving portion 134 or 136. In the illustrated embodiment, the locking pin 138 is associated with the second dock 116, and extends into and out of the notch 136 of the receiving portion area. Typically, the pin 138 is biased into the closed position, such as by means of a spring mechanism 140 or the like. A lever 142 may be used to manually lift the locking pin 138 into the open or unlocked position, wherein the spring bias will close the lever 142 and locking pin 138 after, for example, the second mount 110 is secured within the notch 136 and receiving portion of the second dock 116, so as to hold the second mount 110 therein and essentially lock the mount 110 and second dock 116 to one another. Use of the manual lever 142 enables the user to use a single hand to attach and lock the luggage supporting bracket 102 to the mounts 108 and 110. The user merely need insert the first mount 108 into the first notch 134 or receiving portion area of the first dock 114, such as by pushing the bracket 102 forward into engagement therewith, and then, so long as the second dock 116 has been moved to an appropriate position, lift lever 142 so as to pull away locking pin 138, and insert the second mount 110 into the notch and receiving portion 136 of the second dock, and then release lever 142, which will cause the locking pin 138 to bias into the closed position, and secure the second dock 116 to the second mount 110, and the luggage supporting bracket 102 to the mounts 108 and 110, and thus the motorcycle 10.

In a particularly preferred embodiment, at least a portion of the exterior of the mounts 108 and 110 have a configuration which substantially conforms with the inner walls of the notches 134 and 136 of the first and second docks 114 and 116, such that there is engagement therebetween, creating secure fit between these components without any giggling or rattling between the mounts 108 and 110 and the luggage supporting bracket 102.

With reference now to FIGS. 9-11, in the illustrated embodiment, the mounts 108 and 110 each include a center tubular portion 144. The center tubular portion 144 is of a decreased diameter with respect to the outer ring portions 146 and 148. Sloped or beveled portions 150 and 152 extend between the center tubular portion 144 and the outer ring portions 146 and 148. These beveled portions have a predetermined angle, such as forty-five degrees. The center tubular portion 144 and the beveled portions 150 and 152 selectively form an engagement portion of the mounts 108 and 110, to which the first and second docks 114 and 116 engage.

The inner walls 154 and 156 defining the notches and receiving portions 134 and 136 of the first and second docks 114 and 116 have a corresponding configuration so as to engage with and interlock with the exterior beveled configuration of the mount 108 and 110. With reference now to FIGS. 16-21, the inner wall 154 defining the notch 134 or open-ended receiving portion 134 of the first dock 114 has a generally flat and raised portion 158 and beveled portions 160 extending downwardly and away from the center portion 158. The beveled angle of wall portions 160 correspond with the beveled portions 150 of the mount 108, such that there is an engagement and tight fit formed therebetween, such as each being at a forty-five-degree angle. Similarly, the inner wall 166 defining the notch or open-ended receiving portion 136 of the second dock 116 also has a beveled configuration corresponding with the beveled configuration of the second mount 110. More particularly, in the illustrated embodiment, the inner wall 156 has a raised and generally flat center portion 162, with beveled wall portions 164 extending away therefrom. Typically, the beveled portions 164 correspond with the angle of the beveled portion 152 of the second mount 110, such as being at a forty-five-degree angle. In this manner, when the second mount 110 is inserted into the receiving portion of the second dock 116, the respective portions 144 and 162 and beveled portions 152 and 164 fit and engage with one another, so as to create a tight fit and strong engagement therebetween. Such engagements, as illustrated in FIGS. 16 and 17, create a strong engagement and fit between the first and second docks 114 and 116 and the first and second mounts 108 and 110. Thus, any rattling or giggling between these connecting points is reduced or even completely eliminated.

Figure 22:
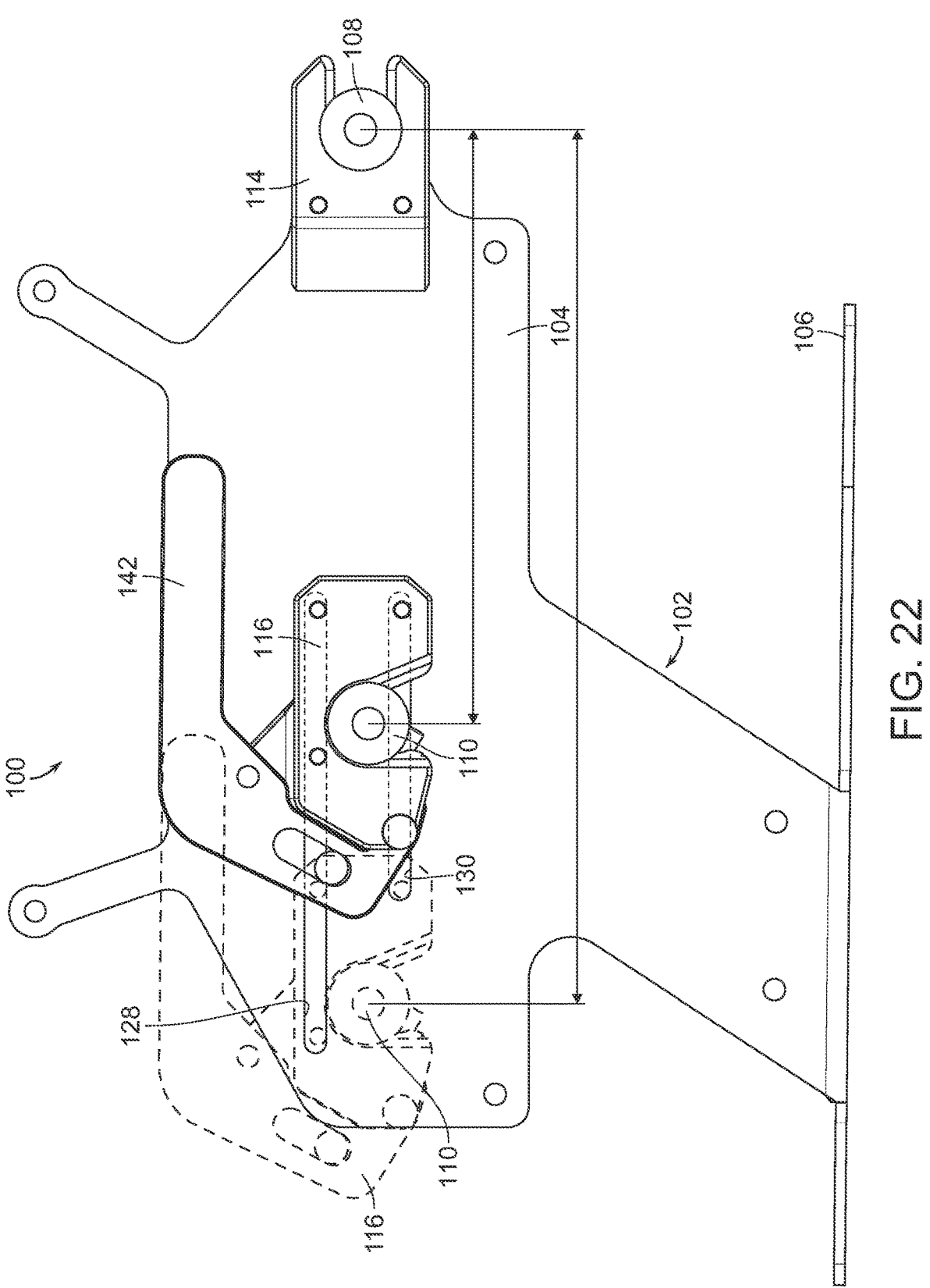
FIG. 22 is a rear side elevational view showing adjustment of the docks relative to one another for attachment to mounts for universal attachment to various motorcycles.
Figure 23:
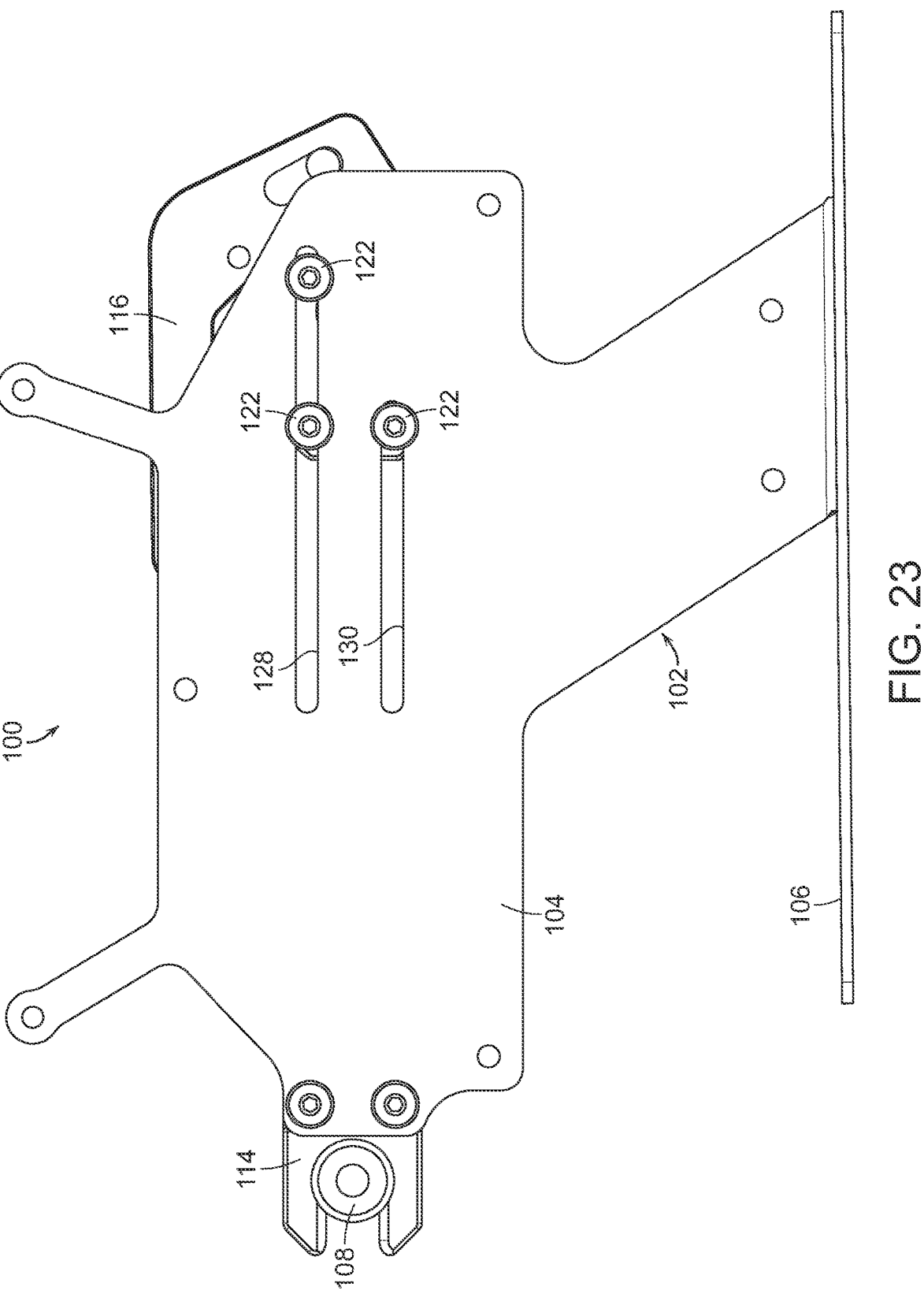
FIG. 23 is a front perspective view of FIG. 22, illustrating attachments of the dock to a bracket of the luggage system, in accordance with the present invention.

As discussed above, the first and second docks 114 and 116 are selectively adjustably spaced from one another on the luggage supporting bracket 102, and more particularly on the attachment portion or plate 104. This may be by a variety of means, such as a series of attachment apertures spaced apart from one another on the attachment plate 104 to which the first and second docks 114 and 116 may be attached, one or more elongated slots or tracks extending substantially the length of the attachment plate 104 to which both the first and second docks 114 and 116 may be attached. In the illustrated embodiment, however, the first dock 114 is attached to the attachment plate 114 at or near a first end 118 thereof. The second dock 116 is attached to one or more elongated slots or tracks 128 and 130. The elongated slots or tracks 128 and 130 enable the second dock 116 to be slidably positioned along a length of the attachment portion or plate 104. For example, fasteners 122 may extend through slots 128 and 130 to couple the second dock 116 to the attachment portion or plate 104. This connection may be made loose, such that the second dock 116 can be slidably moved along a length of the tracks 128 and 130, until positioned at a desired location, after which the fasteners 122 are tightened so as to securely fasten the second dock 116 in place. Thus, the distance between the first dock 114 and second dock 116 can be adjusted, as shown by the arrows in FIG. 22, wherein the second dock may be positioned a greater distance to the first dock 114 or a shorter spaced distance between it and the first dock 114. Providing two parallel tracks 128 and 130 provides a stable slidable connection between the second dock 116 and the attachment portion plate 104, without any concerns of pivoting or the like by the second dock 116. The length of the slots or tracks 128 and 130 may correspond to a predetermined range of distances that will be encountered by a wide range of motorcycle mounting locations, such that the second dock 116 may be positioned over the second mount 110 after the first mount 108 is inserted into the receiving portion or notch 134 of the first dock 114.

As mentioned above, the distance between mounts 108 and 110 can vary between different motorcycles. The selective adjustability of spacing between the first and second docks 114 and 116 enables the luggage supporting bracket 102 to be attached to mounts 108 and 110 positioned on a variety of motorcycles, and thus making it a universal or near universal fit to all motorcycles. Thus, the luggage system 100 of the present invention could be used in connection with a large number of motorcycles, such that if a user owns more than one motorcycle or buys a new motorcycle the user will not be required to purchase a new luggage system, but rather can utilize the luggage system 100 of the present invention between the different motorcycles. All that is required is that the user attach the mounts 108 and 110 to the motorcycle, so that they extend therefrom, and then adjust the position of the second dock 116 so that the mounts 108 and 110 can become inserted into and engaged with the first and second docks 114 and 116.

Although several embodiments have been described in detail for purposes of illustration, various modifications may be made without departing from the scope and spirit of the invention. Accordingly, the invention is not to be limited, except as by the appended claims.

What is claimed is:

1. A motorcycle luggage system, comprising:
a luggage supporting bracket;
a first dock and a second dock attached to the luggage supporting bracket, wherein the first and second docks are selectively adjustably spaced from one another; and
a first mount and a second mount attached to a motorcycle to extend therefrom in spaced relation to one another, wherein the first dock is coupled to the first mount and the second dock is coupled to the second mount to attach the luggage supporting bracket to the motorcycle, and wherein the first and second mounts each include an engagement portion having a beveled configuration.

2. The motorcycle luggage system of claim 1, wherein the luggage supporting bracket comprises an attachment portion and a supporting portion extending from the attachment portion for supporting luggage thereon.

3. The motorcycle luggage system of claim 1, wherein the first and second docks are slidably associated with one another on the luggage supporting bracket.

4. The motorcycle luggage system of claim 3, wherein the luggage supporting bracket includes an elongated slot to which the second dock is selectively slidably connected.

5. The motorcycle luggage system of claim 4, wherein the second dock is connected to the slot along a length thereof to selectively adjust a distance between the first and second docks corresponding to a distance between the first and second mounts.

6. The motorcycle luggage system of claim 1, wherein at least one of the first and second dock includes a locking pin for locking the first or second dock to the first or second mount.

7. The motorcycle luggage system of claim 6, wherein the locking pin is movable into an open position and biased towards a closed locking position.

8. The motorcycle luggage system of claim 7, including a lever operably attached to the locking pin for manually moving the locking pin from the locking position to the open position.

9. The motorcycle luggage system of claim 1, wherein the first and second docks each include a mount receiving portion, the mount receiving portion having a beveled configuration corresponding to the beveled engagement portion of the respective first and second mounts such that the beveled receiving portions of the first and second docks interface with the beveled engagement portions of the respective first and second mounts to securely couple the first and second docks to the first and second mounts.

10. A motorcycle luggage system, comprising:
a luggage supporting bracket comprising an attachment portion and a supporting portion extending from the attachment portion for supporting luggage thereon;
a first dock and a second dock attached to the attachment portion of the luggage supporting bracket wherein the first and second docks are selectively adjustably spaced from one another; and
a first mount and a second mount attached to a motorcycle to extend therefrom in spaced relation to one another, wherein:
the first dock is coupled to the first mount and the second dock is coupled to the second mount to attach the luggage supporting bracket to the motorcycle;
one of the first and second docks includes a locking pin for locking the first or second dock to the respective first or second mount; and
the first and second mounts each include an engagement portion having a beveled configuration and the first and second docks each include a mount receiving portion having a beveled configuration corresponding to the beveled engagement portion of the respective first and second mounts such that the beveled receiving portions of the first and second docks interface with the beveled engagement portions of the respective first and second mounts to securely couple the first and second docks to the first and second mounts.

11. The motorcycle luggage system of claim 10, wherein the first and second docks are slidably associated with one another on the luggage supporting bracket.

12. The motorcycle luggage system of claim 10, wherein the luggage supporting bracket includes an elongated slot to which the second dock is selectively slidably connected.

13. The motorcycle luggage system of claim 12, wherein the second dock is connected to the slot along a length thereof to selectively adjust a distance between the first and second docks corresponding to a distance between the first and second mounts.

14. The motorcycle luggage system of claim 10, wherein the locking pin is movable into an open position and biased towards a closed locking position.

15. The motorcycle luggage system of claim 14, including a lever operably attached to the locking pin for manually moving the locking pin from the locking position to the open position.

16. A motorcycle luggage system, comprising:

a luggage supporting bracket comprising an attachment portion and a supporting portion extending from the attachment portion for supporting luggage thereon;

a first dock and a second dock attached to the luggage supporting bracket wherein the first and second docks are selectively adjustably spaced from one another; and a first mount and a second mount attached to a motorcycle to extend therefrom in spaced relation to one another, wherein:

the first and second docks are slidably associated with one another on the attachment portion of the luggage supporting bracket;

the attachment portion of the luggage supporting bracket includes an elongated slot to which the second dock is selectively slidably connected;

the second dock is connected to the slot along a length thereof to selectively adjust a distance between the first and second docks corresponding to a distance between the first and second mounts; and the first dock is coupled to the first mount and the second dock is coupled to the second mount to attach the luggage supporting bracket to the motorcycle;

wherein the first and second docks each include a mount receiving portion, the mount receiving portion having a beveled configuration corresponding to a beveled engagement portion of the respective first and second mounts such that the beveled configurations of the first and second docks interface with the beveled engagement portions of the respective first and second mounts to securely couple the first and second docks to the first and second mounts.

17. The motorcycle luggage system of claim 16, wherein at least one of the first and second dock includes a locking pin for locking the first or second dock to the first or second mount.

18. The motorcycle luggage system of claim 17, wherein the locking pin is movable into an open position and biased towards a closed locking position.

19. The motorcycle luggage system of claim 18, including a lever operably attached to the locking pin for manually moving the locking pin from the locking position to the open position.

20. The motorcycle luggage system of claim 16, wherein the first and second mounts each include an engagement portion having a beveled configuration.

\*    \*    \*    \*    \*